May 19, 1936.   W. GEHRKE ET AL   2,041,465
DEVICE FOR OBTURATING MULTICOLOR FILTERS
Filed July 6, 1933
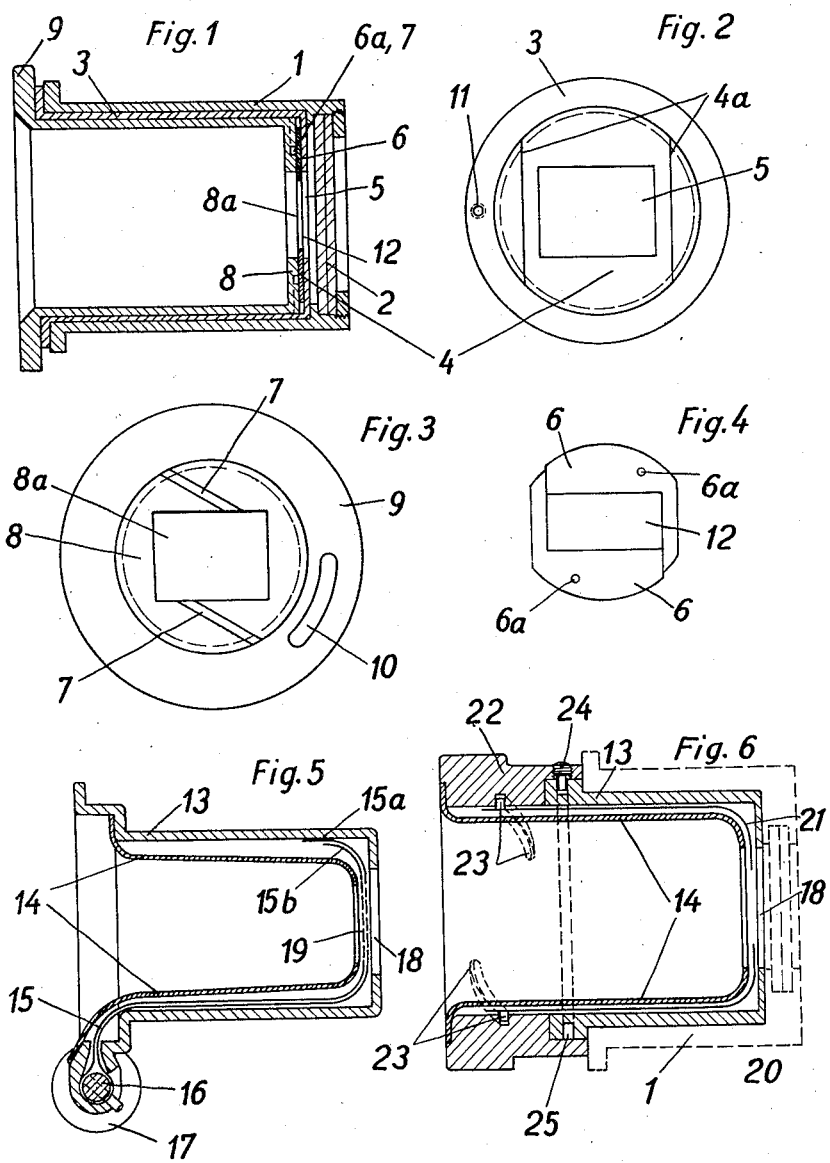
Inventors:
Wilhelm Gehrke
Georg Stohmenger
By Attorneys
Potter, Pierce & Scheffler Patented May 19, 1936

2,041,465

UNITED STATES PATENT OFFICE 2,041,465

DEVICE FOR OBTURATING MULTICOLOR FILTERS

Wilhelm Gehrke and Georg Strohmenger, Munich, Germany, assignors to I. G. Farbenindustrie Aktiengesellschaft, Frankfort-on-the-Main, Germany, a corporation of Germany Application July 6, 1933, Serial No. 679,260
In Germany July 9, 1932

3 Claims. (Cl. 95—81.5)

Our present invention relates to an attachment for obturating multi-color filters.

The co-pending application Ser. No. 670,160, filed May 9, 1933, by Heymer, has for its object to take pictures on films having an emulsion layer of a higher speed by using instead of the uncontrollable masks which were placed on the color filter, a diaphragm which is adjustable in the direction of the color stripes and is arranged at a substantial distance from the multi-color filter. This specification furthermore points out that the tubular extension of the objective acting as a sun shade renders it exceedingly difficult to mount a continuously controllable masking device.

An obturating device in accordance with this invention comprises slidable members arranged within the tubular extension and forming in close proximity to the filter an aperture having edges perpendicular to the direction of the filter stripes and variable in respect of its width (that is, in its dimension perpendicular to the said edges) by movement of the slidable members in opposite directions.

In one construction according to the invention the slides are operated by means of a rotatable ring which is mounted on the objective tube and is connected to the sliding members through a pin and slot connection.

The slidable members may consist of two angular steel slides mounted in guideways in close proximity to the filter and operated by the aforesaid pin and slot connection; or they may consist of two flexible, resilient bands arranged close to the inner wall of the objective tube and having their end portions adjoining the filter turned inwardly so as to form the aperture. According to another construction, the slidable members form runs of a single flexible band passing around a roller or the like and the aperture is formed by openings in adjacent portions of the runs, so that movement of the runs in opposite directions causes relative movement of the openings and consequent variation in the width of the effective aperture.

The invention is illustrated in the accompanying drawing in which

Fig. 1 is a longitudinal section through an objective tube provided with a multi-color filter for taking pictures on lenticular films, Fig. 2 is a front view of the outer tube of the obturating device with a guideway for the diaphragm slides, Fig. 3 is a front view of the controlling ring with a tube-like extension and the controlling slits for the color diaphragm, Fig. 4 shows in detail the diaphragm slides, Figs. 5 and 6 are longitudinal sections through two modified devices according to this invention.

In the objective tube 1, the color filter 2 for taking pictures on lenticular films is fixedly mounted in such a manner that the filter stripes, comprising, for instance, three partial colors, run in the same direction as the lenticular elements of the film. The objective tube 1 further holds the outer diaphragm tube 3, the end wall 4 of which, facing the color filter 2, has a rectangular opening 5. On the end wall 4 the slides 6 of the diaphragm, which serve to limit the filter stripes, are slidably mounted in guideways 4a. The diaphragm slides 6 are angular in form, each having a pin 6a. This pin is guided in slots 7 inclined to the edges of the diaphragm aperture and provided in the end wall 8 of the rotatable ring member 9. The end wall 8 has furthermore a rectangular opening 8a which is rotated when turning the ring 9. The tubular part of the rotatable ring member 9 is disposed within the outer diaphragm tube 3. On its front side the ring member 9 bears a slot 10, which in co-operation with a pin 11, provided on the stationary objective tube 1, limits the movement of the ring 9.

It may be seen from Fig. 1 that when turning the ring 9, the end wall 8 having slots 7 is likewise turned with regard to the stationary objective tube 1 and, therefore, the slides 6 sliding in fixed guiding means 4a are displaced by the pins 6a in such a manner that the rectangular opening is increased or decreased in width, so that the different filter stripes are uniformly stopped in their longitudinal direction.

In a modification of Fig. 1, shown in Fig. 5 inside an objective tube 13 there is placed a sleeve 14. Between the tube 13 and the sleeve 14 there is slidably provided a flexible steel band 15 serving as a mask. The flexible steel band 15 is guided round the pin or roller 16 and fixed thereto, so that when turning the knob 17, which is connected to the pin 16 the band mask is displaced. At the opening 18 of the diaphragm tube 13 the band mask has two rectangular openings 19 (cf. the dotted lines). The free ends of the band mask are designed 15a and 15b. When turning the knob 17 one end of the band mask, for instance 15a, will approach the exposure window while the other free end 15b of the band mask moves away from it. In this manner the rectangular slot is decreased or increased and the filter stripes are stopped in their longitudinal direction.

Fig. 6 represents another form of a device according to this invention. With this arrangement the band masks 20 and 21 form at their free ends the aperture of the diaphragm and are controlled by a regulating ring 22, which by a pin-and-slot connection 23 co-operates with the mask bands. All other parts which this device has in common with the device illustrated in Fig. 5 bear the same reference numbers. The regulating ring 22 is rotatably connected, by means of a stud 24, with the objective tube 13 which is provided with an annular groove 25.

The attachment is connected with the camera by introducing it in the objective tube. It may be held in the desired position by a pin fixed on the attachment, said pin engaging a slot provided in the objective tube.

What we claim is:

1. An attachment for obturating multi-color filters which comprises a tube adapted to be mounted in an objective tube containing a multi-color filter with parallel stripes, two slides mounted in said first tube said slides having edges extending perpendicularly to the stripes of said filter, and means for moving said slides against each other in the plane formed by said edges and in direction perpendicularly to said edges, said means comprising a manually operated ring member operatively connected to the said slides by pin and slot means.

2. An attachment for obturating multi-color filters consisting of parallel stripes which comprises two tubes arranged within one another so that they can be turned against each other, two slides each provided with a pin arranged between said tubes, said pins engaging slots provided in a bent portion of the inner tube, so that on turning the inner tube said slides move against each other.

3. An attachment for obturating multi-color filters consisting of parallel stripes which comprises a tube provided with a groove, a ring connected with said tube by means of a pin engaging said groove, slots provided in said ring and extending at an acute angle to the axis of said tube, two flexible bands, provided with pins engaging said slots so that on movement of said ring, said bands are moved against each other.

WILHELM GEHRKE.
GEORG STROHMENGER.